(12) United States Patent
Krstic

(10) Patent No.: US 6,923,081 B2
(45) Date of Patent: Aug. 2, 2005

(54) SURROGATE

(75) Inventor: Alexander Krstic, Edinburgh (AU)

(73) Assignee: The Commonwealth of Australia (AU)

( * ) Notice: Subject to any disclaimer, the term of this patent is extended or adjusted under 35 U.S.C. 154(b) by 94 days.

(21) Appl. No.: 10/343,093

(22) PCT Filed: Jul. 24, 2001

(86) PCT No.: PCT/AU01/00897

§ 371 (c)(1),
(2), (4) Date: Jan. 24, 2003

(87) PCT Pub. No.: WO02/09068

PCT Pub. Date: Jan. 31, 2002

(65) Prior Publication Data

US 2003/0183025 A1 Oct. 2, 2003

(30) Foreign Application Priority Data

Jul. 24, 2000 (AU) .............................. PQ8943

(51) Int. Cl.$^7$ ............................................ G09B 23/32
(52) U.S. Cl. ................................................... 73/866.4
(58) Field of Search ............................ 73/865.1, 865.6, 73/865.4, 866.4; 434/262, 267, 270, 274

(56) References Cited

U.S. PATENT DOCUMENTS 3,890,723 A * 6/1975 Haurat et al. ............... 434/267
4,488,433 A 12/1984 Denton et al.
4,701,132 A 10/1987 Groesch et al.
5,018,977 A 5/1991 Wiley et al.
5,589,651 A 12/1996 Viano et al.
5,648,915 A * 7/1997 McKinney et al. ......... 382/141
5,741,989 A 4/1998 Viano et al.

FOREIGN PATENT DOCUMENTS

WO     WO-98/47122 A     10/1998

OTHER PUBLICATIONS

Bass, C., "Development of a Procedure for Evaluating Demining Protective Equipment", Journal of Mine Action, Version 4.2, Jun. 2000, <URL:http://maic.jmu.edu/journal/4.2/focus/bass/bass.htm>.

Shin, Y. & Oglesby, D., "Simulation of Biodynamic Response to Underwater Explosion Events" NPS Research, vol. 8, No. 3, Oct. 1998, <URL:http://web.nps.navy.mil/~code09/newsletters/winter983.pdf>.

* cited by examiner

Primary Examiner—Robert Raevis
(74) Attorney, Agent, or Firm—Akerman Senterfitt

(57) ABSTRACT

A surrogate for testing an effect of physical trauma on a whole or portion of a natural biological animal body where the surrogate has a surrogate bone or bones and material replicating the effect of flesh around such a bone or bones. Also disclosed are further parts of a natural body which are replicated with surrogate materials in a surrogate construction including skin, tendons, arteries, and joints between bones as well as sensors for measuring the effect of any trauma caused.

44 Claims, 7 Drawing Sheets

SECTION A-A

SURROGATE

The invention relates to a surrogate for testing effects of physical trauma on a natural biological animal body.

PRIOR ART

There has been no prior work done in this specific field to date and no physical model of suitable bio-fidelity exists as a research aid in this area. Models used previously have been those of the conventional test crash dummies, using mechanical levers with measuring devices attached to the levers.

An object of the invention is to provide a whole or portion of a surrogate which will provide a more representative reaction of a natural biological animal body than that which has hitherto before been available.

BRIEF SUMMARY OF THE INVENTION

According to one form of the invention there is provided a surrogate for testing an effect of physical trauma on a whole or portion of a natural biological animal body characterised in that said surrogate has at least one inner structural element replicating an effect of a bone or bones and at least one pliable material located to surround said element replicating the effect of flesh around a bone.

In a preferred form of the invention the surrogate further includes a plurality of structural elements which have the approximate shape, density and rigidity of bones of a natural biological animal body, thereby replicating a skeletal structure of a natural biological animal body for which the effect is to be tested.

In a preferred form of the invention the surrogate further includes flesh surrounding said skeletal structure of the surrogate, wherein said flesh of the surrogate replicates the effect of flesh of a natural biological animal body.

In a preferred form of the invention the flesh of the surrogate includes material utilising gelatin in the range of 270–300 Bloom.

In a preferred form of the invention the material is aqueous gelatin having a concentration of 20–30% w/w.

In a preferred form of the invention the surrogate further includes at least one conduit extending through the pliable material.

In a preferred form of the invention the conduit is an artery replicating the effect of an artery of a natural biological animal body.

In a preferred form of the invention the pliable material includes blood replicating the effect of blood of a natural biological animal body.

In a preferred form of the invention the artery of the surrogate includes silastic and gortex tubing filled with ingestible X-ray tracer for digestive tract.

In a preferred form of the invention an outermost surface material surrounds the pliable material.

In a preferred form of the invention the outermost surface material is skin, replicating the effect of skin of a natural biological animal body.

In a preferred form of the invention said skin of the surrogate is comprised of an animal chamois conditioned with oil so that said skin of the surrogate has elasticity and tensile strength.

Preferably said skin of said surrogate consists of a thermo-vacuum drape moulded ethyl vinyl acetate (EVA) skin form has also been used, along with a 2-pack silicone spray on skin.

In a preferred form of the invention the animal chamois is conditioned with aqueous glycerol and a preservative.

In a preferred form of the invention the skin is conditioned with aqueous glycerol, wherein glycerol content is in the range of 0–80% w/w.

In a preferred form of the invention said bones forming the skeleton of the surrogate are held in relative alignment so as to replicate alignment of a skeleton in a natural biological animal body.

In a preferred form of the invention the bones of the surrogate are individually cast and hand assembled.

In a preferred form of the invention the skeletal structure further includes a low viscosity polyamide binder holding said bones of the surrogate.

In a preferred form of the invention the shape of said skeletal structure replicates characteristics of skeletal members of a natural biological animal body.

In a preferred form of the invention the surrogate further includes reinforcing fibre.

In a preferred form of the invention the reinforcing fibres are selected from the group including but not limited to Twaron, Dyneema, Carbon and Glass, both diced and pulped.

In a preferred form of the invention the binder is comprised of epoxy resin.

In a preferred form of the invention a substantial proportion of the binder is comprised of tri-calcium phosphate.

In a preferred form of the invention appropriate materials exhibiting X-ray transparency or opacity can be added to said binder.

In a preferred form of the invention the surrogate includes a natural human body replicating characteristics that assist in obtaining similar effect of trauma on a natural human body.

In a preferred form of the invention the surrogate includes a leg replicating a leg of a natural biological animal body.

In a preferred form of the invention the leg of the surrogate includes a plurality of channels of sensor output.

In a preferred form of the invention the channels of sensor output include strain gauges, thermocouples, transducers, pressure gauges and accelerometers, and the like.

In a preferred form of the invention a technique of photo elastic plastic coating (polarized phenyl formaldehyde resins) is used to visualise strain distribution.

Preferentially pressure sensitive colour film is used to visualise pressure distribution profiles. Typically Fuji colour film may be used.

In a preferred form of the invention computer tomography is used.

In a preferred form of the invention the surrogate includes a thoracic component wherein said thoracic component of the surrogate replicates characteristics that assist in obtaining similar effect of trauma on a thoracic component of a natural biological animal body.

For example a thoracic cage consisting of a glass-nylon soft core is then alloy coated to raise the 'bulk' strength and stiffness properties up to the desired values. The thoracic cage is then gloved in a thermo-vacuum formed silicone skin and forms the basis of a re-usable analytical tool for 'blast lung' studies.

In a preferred form of the invention the blood of the surrogate is X-ray visible.

In a preferred form of the invention the bones of the surrogate include a high proportion of water content.

In a preferred form of the invention the bones of the surrogate include an impervious barrier on external surfaces of said bones.

In a preferred form of the invention the bones of the surrogate include within their composition foaming agents.

In a preferred form of the invention the foaming agents include glass microspheres.

In a preferred form of the invention the bones of the surrogate include low viscous aqueous gelatin.

In a preferred form of the invention the surrogate further includes ligamentous sheaths replicating ligamentous sheaths of a natural biological animal body, wherein said ligamentous sheaths of the surrogate are located at joints of the surrogate.

In a preferred form of the invention the ligamentous sheaths of the surrogate include aqueous gelatin conditioned bandages as well as preformed silicone capsules.

In a preferred form of the invention the surrogate further includes tendons replicating tendons of a natural biological animal body.

In a preferred form of the invention the tendons of the surrogate include animal chamois conditioned with oil, in which said animal chamois has previously undergone the process of being rolled, soaked in aqueous gelatin and set.

In a preferred form of the invention the tendons of the surrogate include nylon 6.6 studs drilled and set into said bones.

In a preferred form of the invention the surrogate further includes non-ferrous metal and acetal universal joints replicating joint articulation within a natural biological animal body.

In a preferred form of the invention the surrogate further includes muscle tissue replicating muscle tissue of a natural biological animal body.

In a preferred form of the invention the muscle tissue of the surrogate is ballistic gelatin.

In a preferred form of the invention the surrogate further includes a protective boot for use with said leg of the surrogate.

It can now be seen that what is proposed is a different approach from the conventional Mannequin device of the prior art. The present invention uses elements of a natural human body such that the effect of trauma can be assessed by conventional medical techniques, for example X-ray analysis, such that the position of the surrogate bone or flesh can be visually examined and recorded in a non-invasive manner.

In many ways the effect is able to be communicated to others in ways which are more easily visualised and more accurately represented. In addition from the trials conducted it was apparent that the effects on a surrogate according to the preferred embodiments of the invention give results different from the results of the previously used devices, which is that of conventional mannequins with lever arms.

BEST MODE FOR CARRYING OUT THE INVENTION

For a better understanding of the present invention specific details of the individual component parts will now be discussed in more detail. By way of example only, an embodiment of the invention is described more fully hereinafter with reference to the accompanying drawings, in which.

Figure 1:
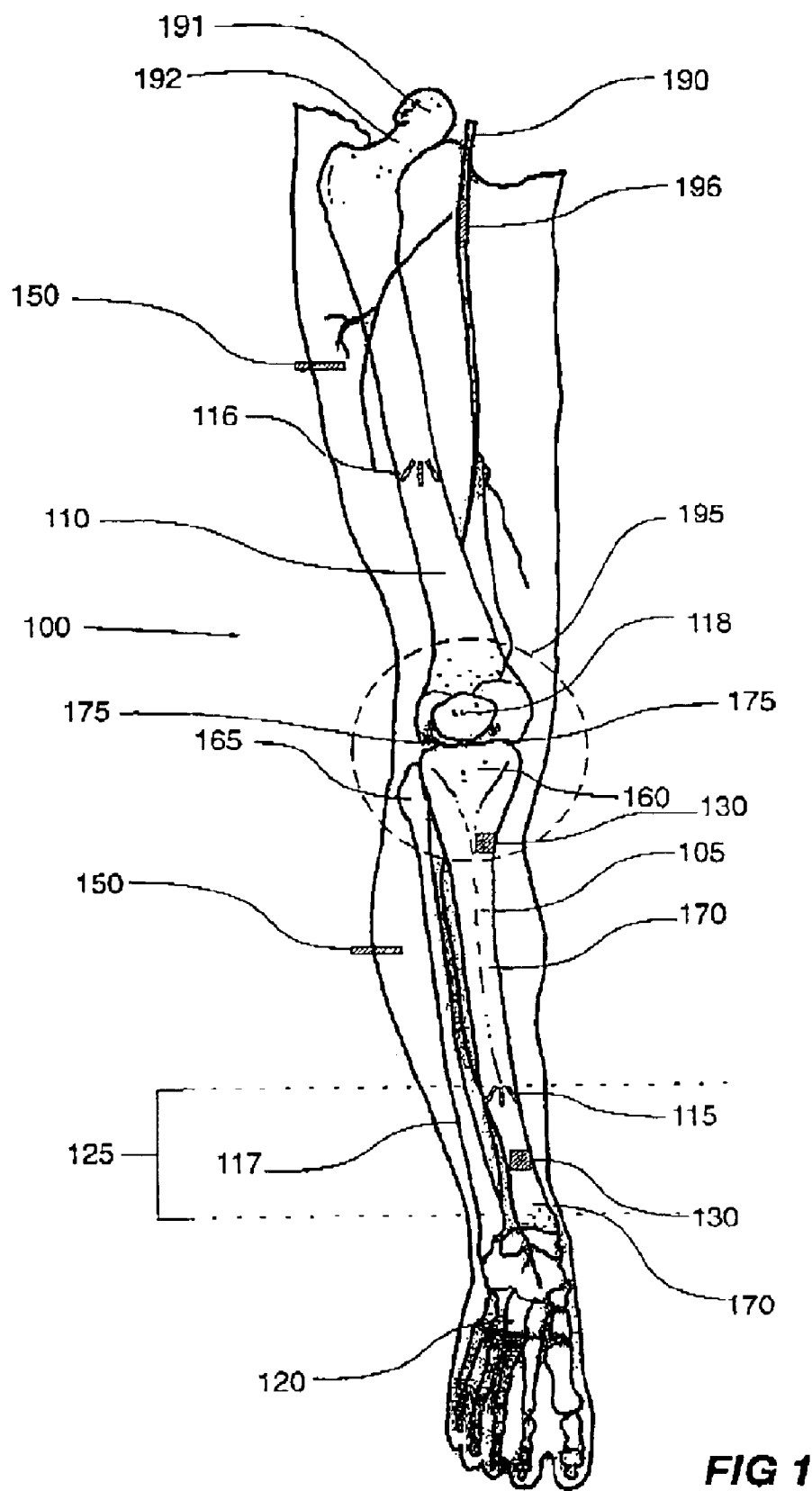
FIG. 1 is an anterior-posterior view of a surrogate leg of the current invention.
Figure 2:
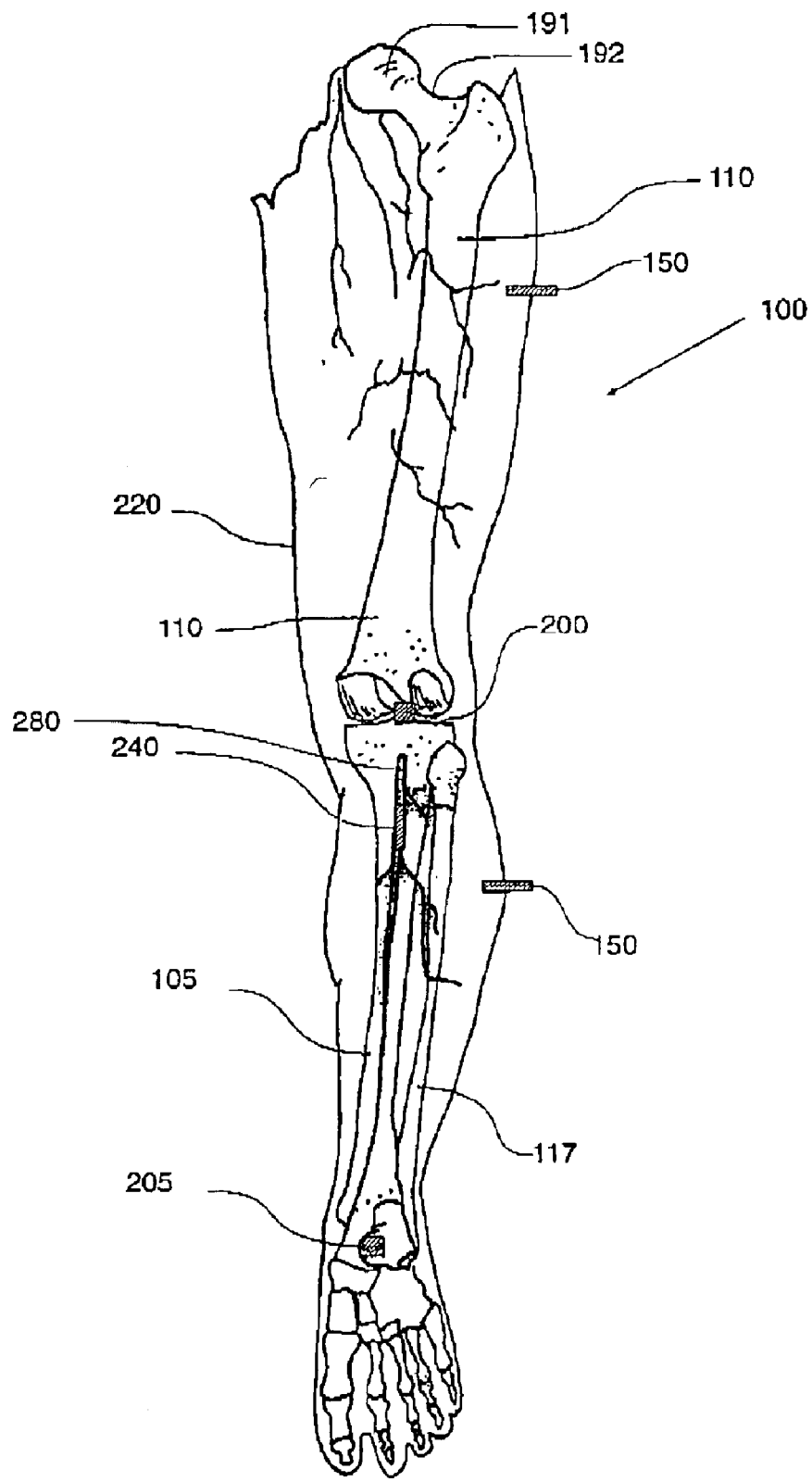
FIG. 2 is a posterior-anterior view of invention as shown in FIG. 1.

It is to be noted that the components referred to below are in reference to the surrogate body, for example the bone, blood, skin, flesh, muscle tissue, arteries, vessels, leg and ligamentous sheaths etc. are all elements of the surrogate.

FSL—Frangible Surrogate Leg

The FSL 100 represents HIRMAN's (Human Instrumented Responding Mannequin) lower extremity sub-component. Channels of sensor output are provided on the FSLs to allow analysis of local and remote effects of load transmission throughout the body. In particular effects such as shock wave-induced versus stress wave-induced bone fracture as well at the type and severity of anatomical and physiological dysfunction are able to be studied.

The FSL 100 each include at least 14 channels of sensor output in the form of pressure transducers, residing inside of vascular components for example arteries, of the surrogate. The muscle tissue includes vessels 190 and 280 and these vessels have blood contained therein. The blood has viscosity of blood of a natural biological animal body and is X-ray visible. Pressure transducers 195 and 240 cap off ends of the vessels to enable analysis at the peak upstream/downstream pressurisation caused by blast flattening and cavity pulses through the tissues.

The FSL 100 has strain gauges 115 and 116 attached to the main bones of the tibia 105 and the femur 110, to measure strain. They are triple rosette strain gauges and are strained in three different axes. The first of these gauges is attached to the lower third 125 of the tibia 105 as this is the thinnest part of the lower leg, being above the rolling point of the foot at the ankle. Due to the off-axis force on the bottom of the foot 120, the foot 120 will tilt over and therefore the first part of the leg to experience this force will be the lower third of the tibia 105. As a consequence a high percentage of breaks occur here on the lower third 125 of the tibia 105.

Figure 3:
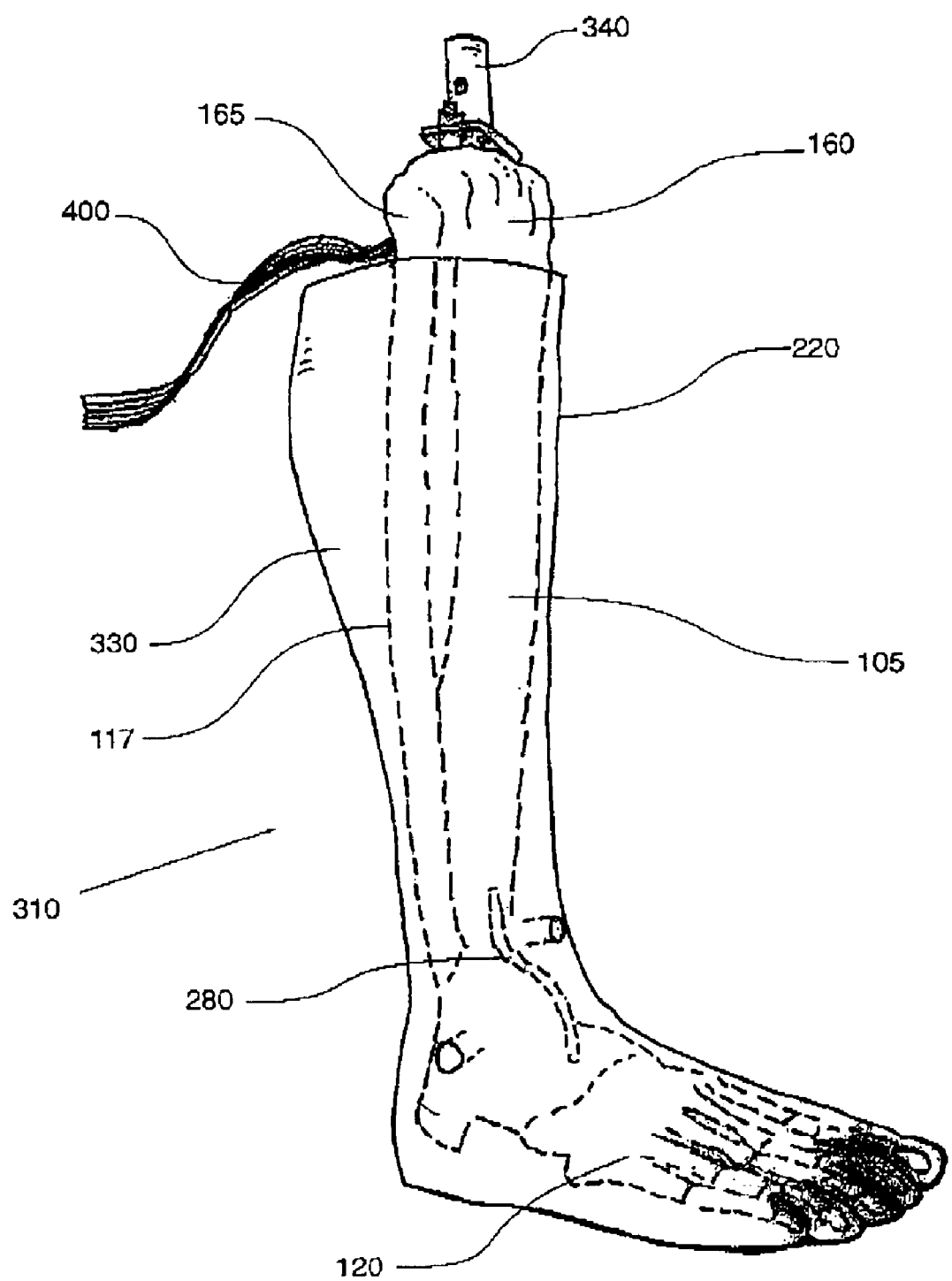
FIG. 3 is a perspective view of the lower leg.

Gauges 116 are also located in the middle of the femur 110 as it is the mid span of the femur 110 that normally breaks under axial load. In addition a pair of circumferential strain gauges 130 are located approximately 25 cm apart on the tibia 105 to catch the shock wave velocity through the tibia bone. Knee and heel mounted accelerometers 200 and 205 provide information on the "crumple zone" action of the lower leg which affords substantial decoupling relief for the rest of the body from the applied load. No gauges were attached to the fibula 117, although there is scope to do so if required. FIG. 3 shows a partially completed FSL or FSLL (frangible surrogate lower leg) 310, with the proximal extremities 160 and 165 of the tibia 105 and fibula 117 respectively extending beyond the simulated muscle 330. The FSLL 310 has a member 340 for attachment to various fittings.

Skin

The skin 220 of the surrogate 100 has undergone considerable modification throughout the trial process. As result of this modification animal chamois is used as the skin. The chamois is reconditioned to normal moisture content by a process of oil enrichment, to replicate not only elasticity and tensile strength but also to replicate the thermal transmission properties of a natural biological animal body. The oil enrichment process involves the use of oil glycerin, (glycerol) which enables greater accuracy in thermal conductivity and ensures the skin 220 stays moist, or elastic for a longer period of time after manufacture.

In further modifications, both ethyl vinyl acetate thermo-vacuum preformed skin gloves and a 2-pack spray-on silicone have also been used to sheath the muscle clad skeletal structure.

Photoelastic Coating

The technique of photoelastic plastic coating (polarised phenyl formaldehyde resins) is used to visualise the general strain distribution in the FSL's tibia 105 and femur 110. For example, the coating may be applied to the surface of the tibia 105 from the proximal extremity 160 down to the distal extremity 170, although this is generally seen as not being necessary and only specific areas may be targeted for application. These phenyl formaldehyde resins exhibit a pseudo-crystalline type of behaviour such that their molecular orientation is modified along the lines of stress. This reorientation manifests itself as interference fringes when viewed under polarised light. In this way photoelastic fringe patterns observed on coated FSLs which have been subjected to laboratory load conditions can provide additional information on the type of gauges to be used and on how to avoid placement of gauges in areas of little significance.

Finite Element Model (FEM) Development

A consequence of force transmission through the FSL is that its constituent elements experience mechanical stress and therefore mechanical strain. Well developed numerical approaches such as finite element methods can be used in parallel with experimental work to analyse the biomechanical response of the FSL upon exposure to force. Accordingly, 3D solid finite element meshes have been derived from the CT digitised datasets extracted from human cadavers and utilised in conjunction with the LS-Dyna3D and IFFSAS hydrocodes.

FSL Diagnostic Imaging

Having rendered the FSLs both computer tomography (CT) and magnetic resonance (MRI) visible, post trials analyses of the FSLs is now a trivial pursuit. Data is now captured via non-intrusive, high resolution 1 mm helical CT scans typically performed on a Silicon Graphics 3D work station. Outputs are presented and stored in the form of CT rotatory 3D surface rendered images, multiplanar CT reformations, 35 mm CT positives, direct video out CT rotating images, 3D CT volume rendering, the tagging of fractures by means of visual enhancement through addition of 'lighting and colour' and X-radiographs.

Summary of Results of Skin Simulant Tensile Testing

The following is a summary of the results obtained in the tensile testing of skin simulant materials in April 1998.

| Material | Average Breaking Load per unit length (kg/mm) | Ultimate Tensile Strength (kg/mm2) | Ultimate percentage Elongation |
|---|---|---|---|
| Human Skin-average properties for leg region (Yamada[1])* | 1.95 | 0.84 | 106.5 |
| 1. 10% Glycerol (small) | 1.95 | 3.16 | 27 |
| 2. 10% Glycerol (large) | 3.03 | 3.57 | 30 |
| 3. 30% Glycerol (small) | 2.2 | 3.45 | 64 |
| 4. 30% Glycerol (large) | 1.93 | 2.86 | 69 |
| 5. 50% Glycerol (small) | 1.66 | 2.25 | 80 |
| 9. 50% Glycerol (large) | 1.59 | 2.01 | 76 |
| 6. 80% Glycerol (small) | 1.63 | 1.7 | 94 |
| 7. 80% Glycerol (large) | 1.76 | 1.6 | 105 |

*30–49 year group, average of both front and back of leg

From the results above, clearly, the skin samples using 80% glycerol contain the closest mechanical properties to the human leg skin samples tested by Yamada. The tensile breaking load/unit width is similar, as is the percentage elongation of the samples. The ultimate tensile strength of the simulant material is, however still approximately double that of human skin. However, undoubtedly, the simulant samples tested are likely to be of greater thickness than the skin samples tested by Yamada and this may be the reason that the UTS is about double, yet the breaking load per unit width is similar.

1. Bone 1.1 Test Sample Preparation Procedure

Approximately 80 g of Part A (Versamid 140 polyamide resin) was measured into a wax-lined paper cup. 75 g of Part B (Epikote 828 epoxy resin) was measured into a separate cup.

30 g of solid powder were ground using a mortar and pestle. A little of the powder was mixed into Part B using a glass stirring rod, then a little more was added and mixed in. This was repeated until all of the powder was evenly mixed with Part B.

The powders used were:

| | Sample Number | Powder |
|---|---|---|
| Series 1 | 1 | (none) |
| | 2 | Zeolite |
| | 3 | Barium Carbonate |
| | 8 | Tri-Calcium Phosphate |
| | 11 | Lead Carbonate |
| | 12 | Lead Oxide |
| | 13 | Potassium Carbonate |
| | 15 | Tungsten |
| Series 2 | 4 | Calcium Carbonate |
| | 5 | Calcium Hydroxide |
| | 6 | Mono-Calcium Phosphate |
| | 7 | Calcium Orthophosphate |
| | 9 | Calcium Oxide |
| | 10 | Lead |
| | 14 | Tungstic Oxide |
| Hybrid Series | H1 | Tri-Calcium Phosphate (20 g) + Tungsten (10 g) |
| | H2 | Tri-Calcium Phosphate (20 g) + Barium Carbonate (IO g) |
| | H3 | Tri-Calcium Phosphate (IO g) + Barium Carbonate (20 g) |
| | H4 | Tri-Calcium Phosphate (20 g) + Lead Carbonate (IO g) |

-continued

| Sample Number | Powder |
|---|---|
| H5 | Tri-Calcium Phosphate (IO g) + Lead Carbonate (20 g) |
| H6 | Zeolite (20 g) + Tungsten (IO g) |
| H7 | Potassium Carbonate (20 g) + Tungsten (10 g) |
| (H8) | Tri-Calcium Phosphate (20 g) + Tungstic Oxide (IO g) |

Note:
To avoid damage to mortar and pestle, elemental tungsten and lead powders were not ground.

75 g of Part A was added to the mixture of Part B and solid powder, and stirred gently (to reduce the number of introduced air bubbles) with a glass stirring rod until the mixture began to stiffen.

The mixture was poured into a teflon-coated steel tray, pre-heated to 50° C. to reduce the viscosity of the mixture and levered by layering strips of aluminium foil under the appropriate edges of the tray as indicated by a spirit level. A spatula was used to assist flow towards the corners of the tray and any large bubbles were pricked with the point of a scalpel blade.

The mixture was allowed to cure uncovered in the tray for 48 hours at ambient temperature.

This procedure was repeated for each sample.

1.2 Hardness Testing

A Zwick Shore-D scale hand-held hardness tester was used. Tests were performed on the most flat surface of each sample (surface not exposed to atmosphere during curing). The average of three readings was calculated for each sample.

1.3 Preparation for X-ray Tests

The X-ray test specimen consisted of samples of bone and vascular simulants embedded in a block of gelatin and skin. The mould for the test specimen was a stainless steel tray, dimensions 150×150×300 mm. When empty, the sides of the mould were angled outwards slightly (5° C.–10° C.) to facilitate removal of the test specimen.

The mould was lined with Glad Wrap to prevent adhering to the mould. Aluminium tape was used to seal the four vertical edges with an additional piece wrapped once around all vertical sides.

Two 150×300 mm pieces of skin were prepared by soaking in gelatin containing 15% anhydrous gel, 40% glycerol and 45% water by mass. One piece was placed in the bottom of the mould. (Gel diluted from 30% to 15% by adding 80% glycerol solution, refer to description of skin preparation below.)

Bone samples were 100×20 mm strips cut from the previously prepared swatches that gave the top five results in tensile tests (mixtures H1, H3, 5, 7 and 8). Vascular component samples consisted of five pieces each of 0.132" ID×0.183" OD and 0.250" ID×0.375" OD 400 mm long silastic tubing (representing the femoral and posterior tibial arteries respectively). The bone and silastic tubing samples were suspended centrally in the gelatin block by gluing with Araldite between two pieces of plastic as shown below.

Arrangement of bone and vascular simulant samples during X-ray test. (All dimensions in mm.)
Bone simulant material:
  H1 H3 5 8 7 H8
Vascular X-ray racer aqueous concentration:
  40%, 45%, 50%, 55% and 60%

The silastic tubing protruded past the ends of the mould to allow radio-opaque dye of different concentrations to be introduced and flushed out subsequent to testing.

Liquid 30% aqueous gelatin was poured to fill the mould. The gelatin was allowed to set uncovered at room temperature and the remaining piece of (wet) skin was placed on top. The specimen was then left for a further hour before removing from the mould.

1.4 Casting Bones

Bones with the composition of sample H1 were cast as solid bones rather than with a hollow shaft.

1.5 Results 1.5.1 Series 1 and 2

| Sample Number | Composition | Hardness (Shore D) | Mean UTS (M-Pa) | Mean % Elongation | X-ray Ranking |
|---|---|---|---|---|---|
| 1 | 75 g Part A<br>75 g Part B | 73 | 2.51 | 2.67 | — |
| 2 | 75 g Part A<br>75 g Part B<br>30 g Zeolite | 74 | 3.31 | 2.39 | — |
| 3 | 75 g Part A<br>75 g Part B<br>30 g Barium Carbonate | 75 | — | — | — |
| 4 | 75 g Part A<br>75 g Part B<br>30 g Calcium Carbonate | 79 | — | — | — |
| 5 | 75 g Part A~<br>75 g Part B<br>30 g Calcium Hydroxide | 80 | 3.43 | 1.34 | 5 |
| 6 | 75 g Part A<br>75 g Part B<br>30 g Mono-calcium Phosphate | 80 | — | — | — |
| 7 | 75 g Part A<br>75 g Part B<br>30 g Calcium Orthophosphate | 78 | 5.76 | 2.59 | 6 |
| 8 | 75 g Part A<br>75 g Part B<br>30 g Tri-calcium Phosphate | 80 | 5.09 | 2.33 | — |
| 9 | 75 g Part A<br>75 g Part B<br>30 g Calcium Oxide | 78 | 3.43 | 1.38 | — |
| 10 | 75 g Part A<br>75 g Part B<br>30 g Lead | 78 | — | — | — |
| 11 | 75 g Part A<br>75 g Part B<br>30 g Lead Carbonate | 78 | 3.84 | 1.9 | — |
| 12 | 75 g Part A<br>75 g Part B<br>30 g Lead Oxide | 75 | — | — | — |
| 13 | 75 g Part A<br>75 g Part B<br>30 g Potassium Carbonate | 75 | — | — | — |
| 14 | 75 g Part A<br>75 g Part B<br>30 g Tungstic Oxide | 76 | — | — | — |
| 15 | 75 g Part A<br>75 g Part B<br>30 g Tungsten | 75 | — | — | — |

1.5.2 Hybrid Series

| Sample Number | Composition | Hardness (Shore D) | Mean UTS (M-Pa) | Mean % Elongation | X-ray Ranking |
|---|---|---|---|---|---|
| H1 | 75 g Part A<br>75 g Part B<br>20 g Tri-Calcium Phosphate<br>10 g Tungsten | 73 | 4.07 | 1.55 | 2 |
| H2 | 75 g Part A<br>75 g Part B | 74 | — | — | — |

-continued

| Sample Number | Composition | Hardness (Shore D) | Mean UTS (MPa) | Mean % Elongation | X-ray Ranking |
|---|---|---|---|---|---|
| H3 | 20 g Tri-Calcium Phosphate<br>10 g Barium Carbonate<br>75 g Part A<br>75 g Part B | 75 | 4.07 | 1.43 | 1 |
| H4 | 10 g Tri-Calcium Phosphate<br>20 g Barium Carbonate<br>75 g Part A<br>75 g Part B | 79 | — | — | — |
| H5 | 20 g Tri-Calcium Phosphate<br>10 g Lead Carbonate<br>75 g Part A<br>75 g Part B | 80 | — | — | — |
| H6 | 10 g Tri-Calcium Phosphate<br>20 g Lead Carbonate<br>75 g Part A<br>75 g Part B | 80 | — | — | — |
| H7 | 20 g Zeolite<br>10 g Tungsten<br>75 g Part A<br>75 g Part B | 78 | — | — | — |
| H8 | 20 g Potassium Carbonate<br>10 g Tungsten<br>75 g Part A<br>75 g Part B<br>20 g Tri-Calcium Phosphate<br>10 g Tungstic Oxide | 79 | — | — | 3 |

1.5.3 Tensile Tests: Raw Results

| Sample | Max. Breaking Load (kg) [MPa] | Min. Breaking Load (kg) [MPa] | Mean Breaking Load (kg) [MPa] | Max. Strain at Failure (%) | Min. Strain at Failure (%) | Mean Strain at Failure (%) |
|---|---|---|---|---|---|---|
| 1 | 23.5 [3.16] | 12.9 [1.74] | 18.66 [2.51] | 3.7 | 1.7 | 2.67 |
| 2 | 28.18 [3.49] | 24.55 [3.04] | 26.74 [3.31] | 2.62 | 2.17 | 2.39 |
| 5 | 29.5 [3.68] | 25.9 [3.23] | 27.5 [3.43] | 1.41 | 1.27 | 1.34 |
| 7 | 47.64 [610] | 42.47 [5.43] | 44.99 [5.76] | 3.23 | 2.29 | 2.59 |
| 8 | 44.82 [5.68] | 40.07 [5.07] | 40.21 [5.09] | 2.62 | 2.00 | 2.33 |
| 9 | 28.87 [3.67] | 22.73 [2.89] | 26.27 [3.34] | 2.1 | 0.97 | 1.38 |
| 11 | 37.09 [4.60] | 26.21 [3.25] | 30.96 [3.84] | 2.75 | 1.54 | 1.9 |
| H1 | 36.96 [4.61] | 28.78 [3.59] | 32.67 [4.07] | 2.04 | 1.31 | 1.55 |
| H3 | 37.41 [4.72] | 24.78 [3.13] | 32.21 [4.07] | 1.56 | 1.25 | 1.43 |

Ultimate tensile strength (UTS, in MPa) was calculated from breaking load and the cross-sectional area of the test sample. Note that 1 MPa=1 kg/mm2 as used by Yamada.

2. Soft Tissue 2.1 Preparation of 30% Aqueous Gel

To act as an anti-fungal agent, 25 g of propionic acid was dissolved in 3,500 mL demineralised water at room temperature.

This solution was poured into a 40 L bath and cooled to 10° C.

Croda gelatin (1,500 g; 270 Bloom) granules were added by sprinkling evenly over the surface of the solution, and the resultant mixture allowed to stand overnight at 10° C.

The hydrated gelatin was then melted by raising the temperature of the bath to 60° C. With the apparatus used, it was necessary to set the regulated temperature to 65° C. to achieve 60° C. in the bath. In order to avoid compromising the gelatin's material strength properties vis-a-vis denaturation, the temperature of the heating bath's circulating media was never allowed to exceed 65° C.

2.2 Preparation of Skin

Skin was prepared from chamois leather (sheepskins), first soaked in demineralised water then in glycerol and gel. Various glycerol concentrations were investigated and the results compared for pliability. Tensile tests were then performed on samples prepared using the preferred method.

2.2.1 Procedure for 80/15 Glycerol/Gelatin Skin

Dry chamois was cut into strips 50×10 cm and allowed to thoroughly wet-up in demineralised water. Water (100 g) was added with stirring to Glycerol (400 g) giving 500 g of 80% (w/w) aqueous Glycerol solution. Wet chamois were 'wrung dried' and allowed to soak in the 80% glycerol solution overnight at room temperature.

Croda Gelatin (150 g; 270 Bloom) was added to a solution of propionic acid (5 g) and water (850 g) and the resultant mixture allowed to stand overnight at 10° C. The semi-transparent, hydrated gelatin was then melted in a 65° C. (max) water bath to give a clear, amber viscous solution of 15% (w/w) aqueous Gelatin (1,000 g).

Having had excess aqueous glycerine gently wiped from it, the treated chamois described above was then soaked overnight at 65° C. in the 1 L solution of 15% aqueous gelatin solution.

The chamois strips were then laid out flat on a stainless steel work surface and allowed to set at ca. 20° C. for 30 min. Small sections (3.5×15 cm) were prepared for use with the fast response thermal gauges whilst the remainder was placed in individual air tight plastic bags and stored at 4° C.

2.2.2 Preparation of Samples for Tensile Tests

Samples were prepared from 10%, 20%, 30%, 50% and 80% glycerol solutions as described above.

2.2.3 Results

Samples prepared from 10% glycerol solution were not pliable, samples prepared from 30% glycerol solution were quite pliable, whereas the samples prepared from both 50% and 80% glycerol solution were very pliable, the latter also being quite mucilaginous to touch.

2.3 Vascular Simulants

The posterior tibial artery was simulated by 0.132" ID×0.183" OD silastic tubing and the femoral artery by 0.250" ID×0.375" OD silastic tubing. These were filled with an iodine-based radio contrast dye. The peak pressure resulting from the blast was measured in these vessels.

3. Assembly of Legs 3.1 Skeleton

The femur 110, tibia 105 and patella 118 were joined, using a polyamide based hot-melt glue on surfaces 175, at the angle determined by the leg mould. Prior to bonding, the articular surfaces of the bones were lightly abraded with emery paper to assist with the adhesion process. This improved the strength of the bond between the flexible bonding agent and the bone simulant material, 'H1'. The femur 110 has a head 191 and neck 192 so as to provide some degree of articulation when the femur 110 is interconnected to a receiving hipbone (not shown). In order to maintain a high level of bio-fidelity, both the neck 192 and head 191 are constructed from the same material as the femur 110.

A precisely orientated slot was milled into the proximal head of the tibia 105 prior to its connection to the femur 110 to allow installation of a uniaxial accelerometer 200 in the knee joint.

Figure 4:
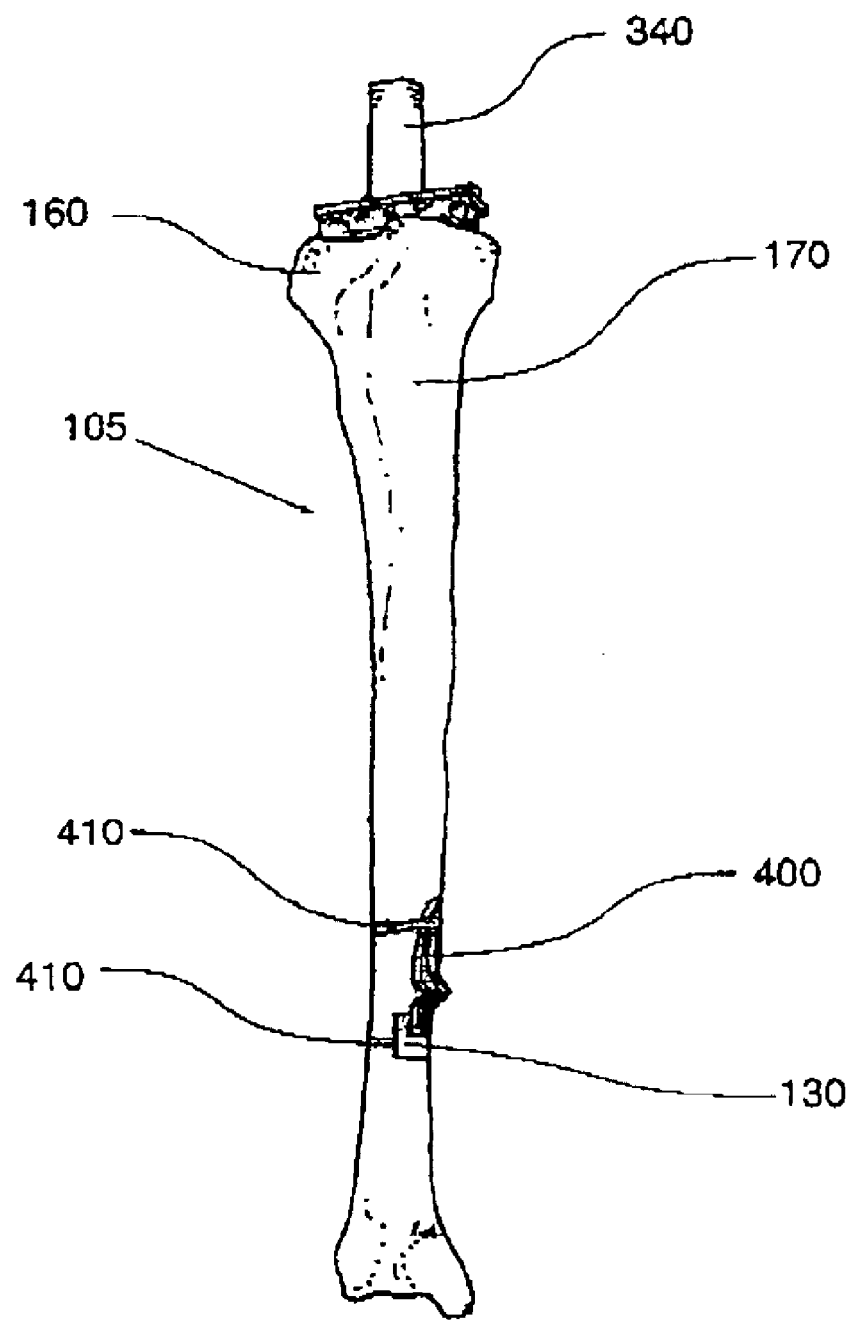
FIG. 4 is a view of the surrogate tibia bone from the leg as shown in FIG. 3.
Figure 5:
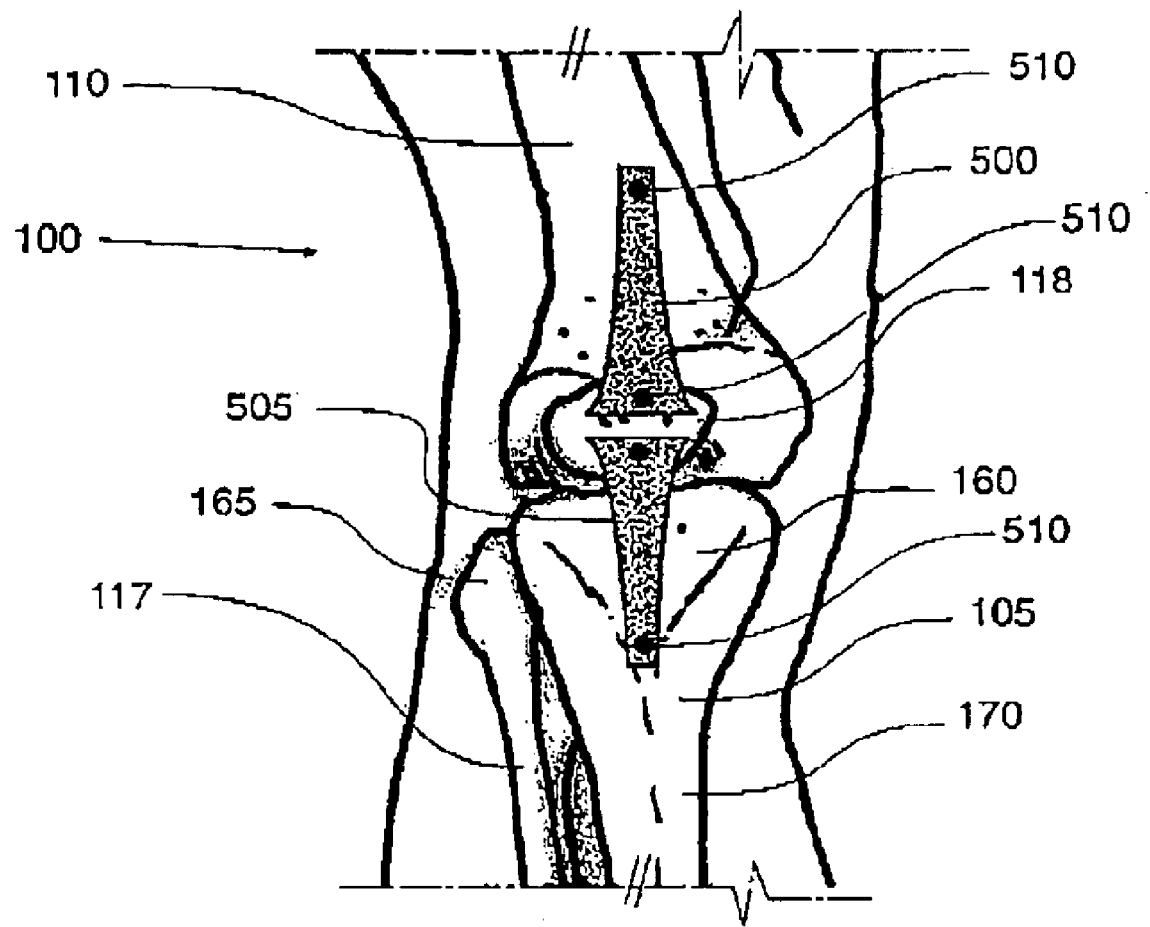
FIG. 5 is a close up of the knee section of FIG. 1.
Figure 6:
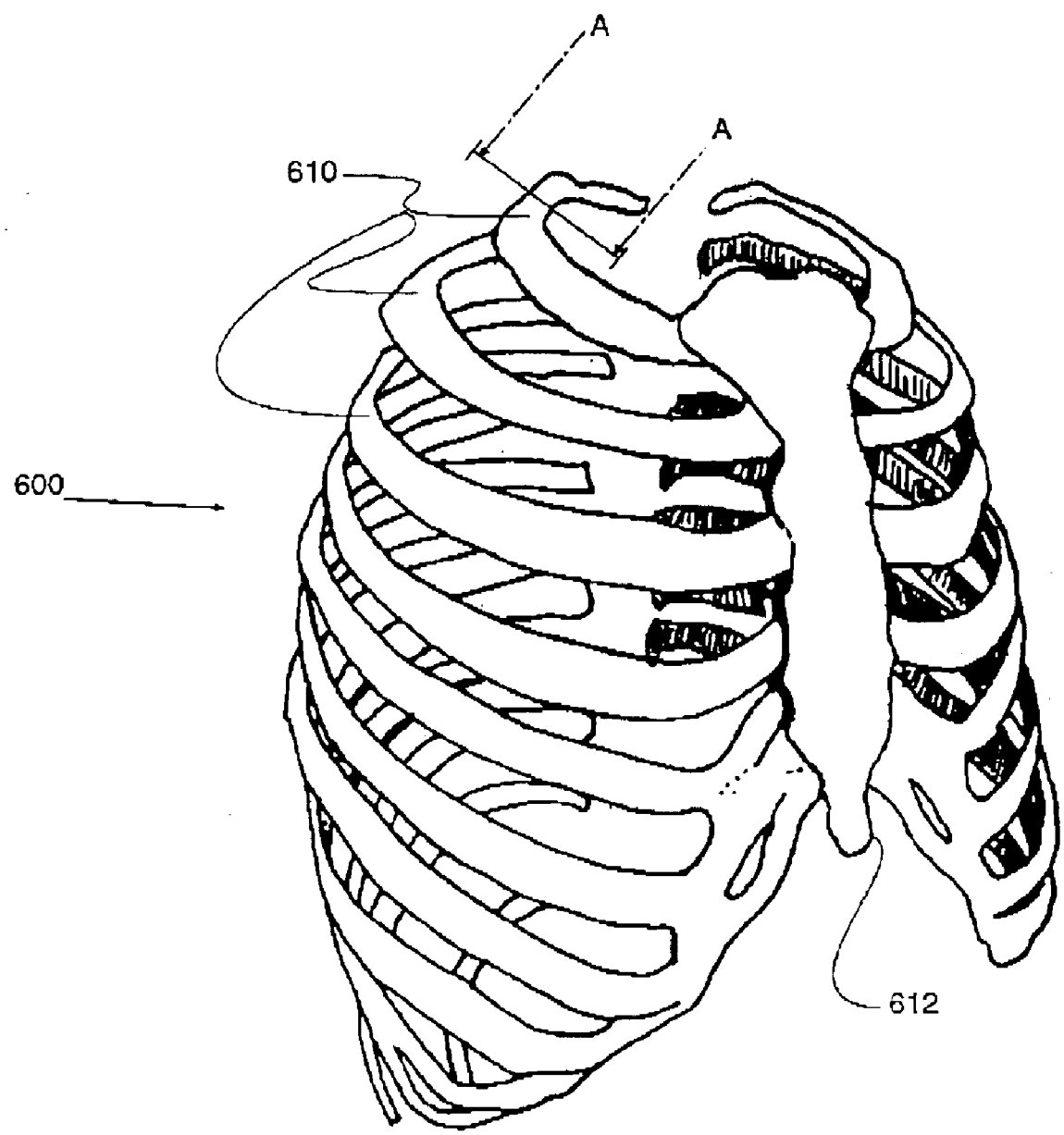
FIG. 6 is a perspective view of the thoracic component.

The femur 110 and tibia 105 were instrumented with strain gauges at specified locations. By way of example, FIG. 4 shows the tibia 105 with the wiring harness 400 for the circumferential strain gauge 130, both being held in place at positions 410 either by ties or by spiral lacing to the bone with cotton thread which was then hot-melt tacked in place.

The foot 120 was assembled in stages:
a) talus and calcaneum [unit 1]
b) navicular, 1st cuneiform, 2nd cuneiform, 1st metatarsal, 2nd metatarsal, 3rd cuneiform, 3rd metatarsal [unit 2]
c) unit 1, unit 2 and cuboid
d) 4th and 5th metatarsals
e) phalanges.

The foot 120 was placed in the open mould to assist in correctly positioning the metatarsals before the adhesive set.

After the foot 120 was bonded to the tibia 105 using the external leg mould as a guide for the correct angle, the fibula 117 was then added. Surrogate quadriceps and patellar tendons, 500 and 505 respectively, were attached to the appropriate surrogate bones 110 and 117 with nylon studs 510 drilled and set into the appropriate bones. Ligaments, such as the cruciate and collateral ligaments may also be added if required.

The entire skeletonised limb was coated in estapol to reduce absorption of water from the gelatin into the bone simulant material.

The surrogate can also include a thoracic component 600 that replicates characteristics of a thoracic component of a natural biological animal body.

Figure 7:
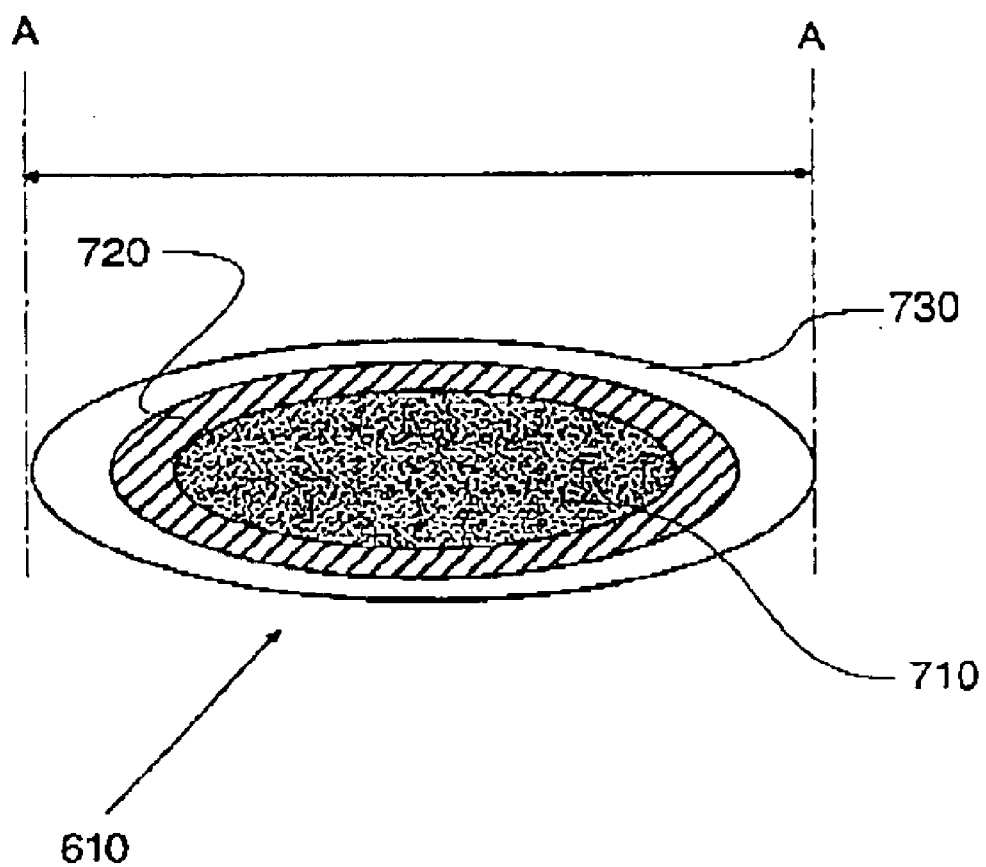
FIG. 7 is a side sectional view through A—A in FIG. 6, showing the composition of the thoracic component shown in FIG. 6.

The thoracic cage 600 consists ribs 610 and a sternum 612 made from a glass-nylon soft core 710 that is alloy coated 720 to raise the 'bulk' strength and stiffness properties up to the desired values. The thoracic cage is then gloved in a thermo-vacuum formed silicone skin 730 as seen in FIG. 7, and the thoracic cage 600 is then attached to the FSL by way of a surrogate pelvis and spine arrangement.

3.2 Skin

A gelatin mixture was prepared containing 15% anhydrous gel, 40% glycerol and 45% water by mass (i.e. 30% aqueous gelatin diluted to 15% by the addition of 80% aqueous glycerol solution, as described previously). Chamois leather skins, presoaked in water and wrung out, were soaked overnight in this gelatin at 60° C.

The mould was lined with gel-soaked chamois. So that the gelatin did not set too quickly, the chamois were not wrung out at all. The skin was placed in the foot first, covering the shin/calf with the same piece of skin, and another piece overlapping this covered the remainder of the half-mould. It was smoothed out over the mould surface, working from the centre line of the mould towards the edges. Remaining air bubbles were removed using syringes and hypodermic needles, and the skin was left to set for at least 20 minutes at 4° C.

The skin was trimmed just inside the margin defined by the interlocking parts of the mould halves. This was done so that the remaining excess skin would form a seam when the mould was closed, preventing the skin from collapsing into the liquid gel. Where there were overlapping layers, the upper layer was removed in this seam region so that only two layers of skin need be compressed by the mould.

3.3 Vascular Components 500 mm lengths of the femoral and posterior tibial artery simulants described above were sealed at one end by folding the tube back onto itself and securing with cable ties. Both tubes were filled with water and similarly sealed at the other end, taking care to ensure that there were no trapped air bubbles. The water in the tubes was to prevent them collapsing when gelatin was later poured around them. Excess tie was removed from both ends of both tubes.

The smaller tube was tied to the posterior face of the distal end of the tibial shaft 105 using cotton thread. Similarly, the larger tube was tied to the medial face of the distal end of the femoral shaft 110.

3.4 Pouring Aqueous Gelatin (Muscular Component)

The assembled skeletal leg was laid on top of the skin in the posterior half of the mould.

A small incision was made in the skin medial to the posterior knee, and the posterior tibial artery simulant was passed through it. A length of stiff wire was used to push the end of the tube up towards the hip joint so that the 'artery' was approximately straight along its length.

The anterior half of the mould was bolted in place, starting at the tip of the foot and working progressively up alternate sides. This ensured that the bolt holes further up the mould would self align.

The head of the femur was positioned using cable ties passed through holes drilled through the mould and skin. A hole for each tie was cut in a small piece of chamois which was lightly wetted with liquid gelatin and positioned to absorb gelatin leaking through the hole in the mould. The cable ties were held in place by clamps.

The mould was partly filled with 50° C. 30% aqueous gelatin from the tap at the bottom of the tank, initially with the toes pointed downwards to avoid trapping air in the foot. The leg was transferred to a 4° C. cold storage room, and the remaining space filled with gelatin poured from a bucket. The leg was then left to set for approximately 6 hours at 4° C.

The leg was removed from the mould, the 'seams' of skin down either side were trimmed off and a stocking and sock were fitted over it.

3.5 Attachment of Type-K Rapid Response Thermocouples to FSLs

The Type-K foil thermocouple (RS 256-130) was reinforced by a length of cellulose tape and then stuck to the prefabricated FSL. A section of freshly prepared chamois based skin (as described above) was laid over the foil gauge. A second tape reinforced foil thermocouple was then set into the outer face of the freshly prepared skin patch in a position which was slightly offset from that of the 'subcutaneous' gauge. The FSL was now ready for both surface and subcutaneous thermal dose evaluation from blast type devices.

3.5 Final Pre-Trial Preparation

The exposed end of the posterior tibial artery 280 was freed from the surrounding gelatin and all but 30 mm removed. The water inside was removed using a syringe attached to a long, thin brass tube having an end rounded with solder to prevent damage to the silastic tubing. The artery 280 was then filled with 45% v/v aqueous 'Gastroview' X-ray tracer, using the same syringe and brass tube to fill from the bottom so that no air bubbles could form. Care was taken to ensure that no tracer was allowed to spill onto the surface of the leg 100.

An environmentally protected pressure transducer 240, which had previously been prepared by coating in layers of heat-shrink wrap, was inserted into the end of the artery 280 so that the gauge 240 was located fully inside the leg 100.

The femoral artery 190 was prepared in a similar fashion and a pressure transducer 195 was inserted therein.

Two holes were bored into the side of the leg 100 using a specially made coring tool. Liquid (30% aqueous) gelatin was poured into the holes and PCB transducers 150 to measure muscle pressure time histories were inserted immediately. Discs glued to the protruding ends of the transducers were used to help secure them in place by wrapping tape around the legs and over the discs.

4. The Appropriate Footwear for the Particular Test was Fitted over the Foot.

4.1 Fibre

To mimic the properties of bone, it was decided that either diced and pulped Twaron, Carbon, Dyneema and Glass fibres should be included for tensile strength.

It was decided that it would be better to bond the fibre in sheet form to the surface of the cast model bones, using the same Versamid/Epikote mixture as the bonding agent. This creates a problem in interpreting the results of tensile tests however, as a single composite material is no longer to be used. Tensile tests performed without the fibre sheet bonded to the surface of the sample would be expected to result in a lower ultimate tensile strength than the final model, but tests performed with the sheet bonded to the surface of the sample may result in a higher UTS. The approximately optimal ratio of fibre sheet to rest of sample was achieved by bonding to one surface only.

4.2 Bubbles

When several samples were held up to the light, it was observed that there were many tiny air bubbles dispersed through them. Such bubbles, inadvertently introduced during the hand mixing process, may act as points at which fracture will be initiated. An automated mixing procedure using a vacuum pump to remove bubbles would be preferable, although more difficult to clean (cf. paper cups which can simply be discarded without cleaning). However, remember also that bone itself is porous (Haversion systems etc.).

From the trials conducted it was apparent that the effects on a surrogate according to the preferred embodiments of the invention give results different form the results of the conventional mechanical devices previously used. The surrogate of the present invention is thereby able to provide a more representative reaction of a natural biological animal body.

The FSL is an unprecedented bio-mechanical analogue human sub-component constructed from materials designed to replicate the hard and soft tissue properties of the human, a feature which is very important for assessment of complex injury processes.

With trials now conducted with the use of the preceding technology it has now been found possible to predict with substantial accuracy the effect of explosive trauma against natural animal physiology. In one specific trial, the leg of a cadaver was used as a control while a leg was prepared as previously discussed. The results of a landmine explosion were very accurately predicted by the results on the surrogate as compared to the results on the cadaver leg. This was in direct contrast to the substantial lack of close predictability previously considered possible by traditional mechanical maniquins.

From the description now given the concept and value of the structure and its wide applicability will be appreciated.

What is claimed is:

1. A surrogate for the purpose of evaluating explosion trauma comprising:
   a plurality of structural elements, wherein said elements have the approximate shape, density and rigidity of bones of a natural biological animal body; and
   at least one pliable material located to surround said element replicating the effect of flesh around a bone, wherein the pliable surrogate flesh material comprises aqueous gelatin having a concentration of 20–30% w/w.

2. A surrogate as in claim 1 wherein the pliable surrogate flesh material comprises gelatin in the range of 270–300 Bloom.

3. A surrogate as in claim 1 wherein the surrogate further includes at least one conduit extending through the pliable material.

4. A surrogate as in claim 6 wherein the conduit acts as a surrogate digestive tract and comprises gortex tubing filled with ingestible X-ray tracer.

5. A surrogate as in claim 1 wherein the surrogate further includes at least one conduit extending through the pliable material replicating an artery of a natural biological animal body.

6. A surrogate as in claim 5 wherein the conduit acting as a surrogate artery is silastic.

7. A surrogate as in claim 1 wherein the pliable material includes a liquid infusing the pliable material as a surrogate blood replicating the effect of blood in flesh of a natural biological animal body.

8. A surrogate as in claim 7 wherein the surrogate blood includes a material such that it is X-ray visible.

9. A surrogate as in claim 1 wherein there is an outermost surface material arranged to act as a surrogate skin, replicating an effect of skin of a natural biological animal body.

10. A surrogate as in claim 9 wherein said skin of said surrogate is formed by being thermo-vacuum drape moulded.

11. A surrogate as in claim 9 wherein the skin is a 2-pack silicone spray-on skin.

12. A surrogate as in claim 9 wherein said skin of the surrogate is comprised of at least in the main an animal chamois.

13. A surrogate as in claim 12 wherein said skin of the animal chamois is conditioned with oil.

14. A surrogate as in claim 9 wherein said skin of said surrogate consists of a ethyl vinyl acetate.

15. A surrogate as in claim 12 wherein said skin of the surrogate is comprised of an animal chamois conditioned with aqueous glycerol and a preservative.

16. A surrogate as in claim 15 wherein the glycerol content is in the range of 0–80% w/w.

17. A surrogate as in claim 1 wherein said surrogate bones form a skeletal structure of the surrogate being held in relative alignment so as to replicate alignment of a skeleton or a part of a skeleton in a natural biological animal body.

18. A surrogate as in claim 17 wherein said bones of the surrogate are cast to be in the shape of a natural bone in a natural biological animal body.

19. A surrogate as in claim 18 wherein the skeletal structure has a low viscosity polyamide binder holding together said bones of the surrogate.

20. A surrogate as in claim 19 wherein the binder includes epoxy resin.

21. A surrogate as in claim 19 wherein a substantial proportion of the binder is tri-calcium phosphate.

22. A surrogate as in claim 19 wherein there is at least one material exhibiting X-ray transparency or opacity in said binder.

23. A surrogate as in claim 18 wherein at least one of the bones of the surrogate includes reinforcing fiber.

24. A surrogate as in claim 23 wherein the reinforcing fibers are selected from the group including Twaron, Dyneema, Carbon and Glass.

25. A surrogate as in claim 1 wherein the surrogate is a leg replicating a leg of a natural biological animal body.

26. A surrogate as in claim 25 wherein the surrogate includes a plurality of channels of sensor output including any one of a strain gauge, a thermocouple, a transducer, a pressure gauge or accelerometer.

27. A surrogate as in claim 1 wherein there is a photo elastic plastic coating on a surface of the surrogate.

28. A surrogate as in claim 27 wherein there is a pressure sensitive colour film located subcutaneously between the surface coating and the pliable flesh material to visualise pressure distribution profiles.

29. A surrogate as in claim 1 wherein the surrogate includes a surrogate thoracic component.

30. A surrogate as in claim 29 wherein the thoracic component is in the form of a thoracic cage consisting of a glass-nylon soft core which is alloy coated and gloved in a thermo-vacuum formed silicone skin.

31. A surrogate as in claim 1 wherein the surrogate bones are formed so as to have a high proportion of water content.

32. A surrogate as in claim 31 wherein the surrogate bones have a liquid impervious barrier on external surfaces of said bones.

33. A surrogate as in claim 31 wherein at least one of the surrogate bones includes within its composition, at least one foaming agent.

34. A surrogate as in claim 33 wherein the foaming agent is glass microspheres.

35. A surrogate as in claim 31 wherein at least one of the surrogate bones includes low viscous aqueous gelatin.

36. A surrogate as in claim 1 wherein the surrogate further includes ligamentous sheaths replicating ligamentous sheaths of a natural biological animal body located at least one of the joints of the surrogate bones.

37. A surrogate as in claim 36 wherein the ligamentous sheath of the surrogate includes an aqueous gelatin conditioned bandage as well as preformed silicone capsules.

38. A surrogate as in claim 1 wherein there is included surrogate tendons replicating tendons of a natural biological animal body.

39. A surrogate as in claim 38 wherein the tendons of the surrogate are formed from animal chamois.

40. A surrogate as in claim 39 wherein the animal chamois has previously undergone a process of being rolled, soaked in aqueous gelatin and set.

41. A surrogate as in claim 1 wherein there is included surrogate tendons replicating tendons of a natural biological animal body and where the tendons of the surrogate are secured to a respective bone of the surrogate.

42. A surrogate as in claim 1 wherein there is included surrogate tendons replicating tendons of a natural biological animal body and where the tendons of the surrogate are secured to a respective bore of the surrogate by nylon studs drilled and set into said bones.

43. A surrogate as in claim 1 wherein the surrogate further includes at least one non-ferrous metal and acetal universal joint providing articulation between bones of the surrogate.

44. A surrogate as in claim 1 further comprising surrogate muscle tissue replicating a muscle tissue of a natural biological animal body, the surrogate muscle tissue comprising ballistic gelatin.

* * * * *

UNITED STATES PATENT AND TRADEMARK OFFICE
CERTIFICATE OF CORRECTION

PATENT NO. : 6,923,081 B2 Page 1 of 1
APPLICATION NO. : 10/343093
DATED : August 2, 2005
INVENTOR(S) : Krstic It is certified that error appears in the above-identified patent and that said Letters Patent is hereby corrected as shown below:

Column 6, line 62, replace "(IO g)" with --(10 g)--

Column 6, line 63, replace "(IO g)" with --(10 g)--

Column 6, line 66, replace "(IO g)" with --(10 g)--

Column 7, line 5, replace "(IO g)" with --(10 g)--

Column 7, line 8, replace "(IO g)" with --(10 g)--

Column 7, line 12, replace "(IO g)" with --(10 g)--

Column 11, line 27, replace "skelatonised" with --skeletonised--

Column 14, line 10, replace "claim 6" with --claim 3--

Column 14, line 38, replace "of a ethyl" with --of an ethyl--

Column 10, line 5, repalce "rope edge" with --top edge--

Signed and Sealed this

Twenty-sixth Day of December, 2006

JON W. DUDAS
*Director of the United States Patent and Trademark Office*